United States Patent Office 3,116,274
Patented Dec. 31, 1963

3,116,274
PRODUCTION OF OLEFINE POLYMERS
Hans Boehm, Speyer, Max Fischer and Ferdinand Haubach, Ludwigshafen (Rhine), Georg Schiller, Mannheim, Erich Umlauf, Heidelberg-Pfaffengrund, and Heinz Weber, Ludwigshafen (Rhine), Germany, assignors to Badische Anilin- & Soda-Fabrik Aktiengesellschaft, Ludwigshafen (Rhine), Germany
No Drawing. Filed Jan. 16, 1957, Ser. No. 634,400
Claims priority, application Germany Jan. 18, 1956
13 Claims. (Cl. 260—94.9)

This invention relates to the production of olefine polymers.

It has been proposed to polymerize olefines under normal or increased pressure in the presence of organo-aluminum or -zinc compounds, if desired containing halogen, and halides of metals of the 4th to 6th sub-groups of the periodic system of the elements. As solvents or diluents there are used indifferent organic liquids which are free from peroxides, alcohols, catalysts, acids, amines, sulfides and other impurities, for example, saturated aliphatic hydrocarbons. In many cases solid film-forming polymers are formed together with oily products, especially when the readily prepared aluminum alkyl sesquichlorides or their components, the monohalogen aluminum dialkyls and quite especially the dihalogen aluminum monoalkyls are used as catalysts.

We have now found that the amount of oily polymers is considerably reduced and the average degree of polymerization can be increased by carrying out the polymerization of olefines, especially with up to about 8 carbon atoms and preferably with up to 4 carbon atoms, such as ethylene, propylene, butylene, isobutylene or mixtures of the same, in the presence of hydrocarbon compounds, if desired containing halogen, of metals of the 2nd sub-group or 3rd main group, halogen-containing compounds of metals of the 4th to 6th sub-groups of the periodic system of the elements and also about 0.1 to 0.9 mol and especially advantageously 0.2 to 0.5 mol (for each equivalent of metal of the metal hydrocarbon compound) of a compound which forms complex compounds with the components of the catalyst. Especially suitable organo-metallic compounds are the alkyl compounds of the metals aluminum, gallium, indium, zinc and cadmium. The alkyl groups are usually short-chained, for example, up to about 8 carbon atoms. It is especially advantageous for the chain length of the alkyl radicals to be 2 to 4 carbon atoms. Compounds in which the metal is united with cycloalkyl radicals or also aromatic radicals may however also be used. Among these may be mentioned especially the cyclohexanes, preferably saturated and if desired substituted by hydrocarbon radicals, especially by alkyl groups, and also phenyl and alkylphenyl radicals. There may be mentioned especially aluminum alkyl sesquihalides, thus a mixture of monohalogen aluminum dialkyl and dihalogen aluminum monoalkyl, the halogen preferably being chlorine, but also possibly being bromine or another halogen, or also the individual compounds, and also aluminum trialkyls, such as aluminum triethyl or aluminum tripropyl. It is especially advantageous to use halogen-free alkyls in the polymerization of propylene. Advantageous halogen compounds of the metals of the 4th to the 6th subgroups of the periodic system of the elements are the halides of titanium, especially titanium tetrachloride, titanium tetrabromide, titanium trichloride or the corresponding chlorides of zirconium, and also the halides of vanadium, for example vanadium pentafluoride, vanadium tetrachloride and the halides of chromium, such as chromium trichloride. The halides of other metals from the said groups of the periodic system may however also be used, thus the halides of hafnium, thorium, niobium, tantalum, molybdenum, tungsten or uranium. In the halides of the metals of the 4th to 6th sub-groups one or more halogen atoms may be replaced by other radicals. Among these there may be mentioned for example compounds of the general formula $MeO_mX_n$. In this formula Me is a metal of the 4th to 6th sub-groups of the periodic system of the elements, O oxygen, X halogen, especially chlorine or bromine, $m$ in general 1 or 2 and $n$ 1 to 4. Members of this group are for example vanadium oxytrichloride and chromyl chloride ($CrO_2Cl_2$). The mol ratio between organo-metallic compound and the halogen compound of a metal of the 4th to 6th sub-groups can be varied within wide limits. At a ratio of about 0.6 to 1 mol of a titanium compound for example to 1 mol of an organo-aluminum compound, polymers are obtained which may be worked up especially well, but in general ratios between about 0.2 and 3 mols of the halogen compound of a metal of the 4th to 6th sub-groups to 1 mol of an organo-metallic compound are capable of being used.

Compounds which form complexes with the catalyst components used are especially compounds containing ether, nitrile and hydroxyl groups. Those compounds are especially advantageous which do not reduce the speed of polymerization. To these belong for example especially saturated aliphatic or cycloaliphatic ethers. The aliphatic ethers preferably have a chain length of up to about 8 carbon atoms, such as diethyl ether, dipropyl ether, diisopropyl ether, dibutyl ether or diamyl ether. They may be symmetrical or unsymmetrical. Suitable cyclic ethers are for example the dioxanes, such as 1.4-dioxane. There also come into question aromatic-aliphatic ethers, especially anisol or phenyl ethyl ether. Suitable nitriles are for example saturated aliphatic nitriles such as acetonitrile and propionitrile.

As compounds containing hydroxyl groups, alcohols are especially suitable. There may be used straight-chain or branched primary, secondary or tertiary alcohols, preferably saturated, especially with up to about 10 carbon atoms but also with more than 10 carbon atoms, as for example ethanol, propanols, butanols, pentanols, isoamyl alcohol or ethyl hexyl alcohol. Aliphatic or cycloaliphatic polyalcohols, especially with 2 to 4 hydroxyl groups, as for example glycerine or trimethylolpropane, and phenols in so far as they will dissolve in the solvent used for the catalyst components, as for example phenol itself and phenols substituted by alkyl groups, such as the cresols, may however also be used. Furthermore there may be used as complex-forming compounds acetals of preferably saturated low molecular weight aliphatic aldehydes, but also cycloaliphatic or aromatic aldehydes, for example propionaldehyde, dimethylacetal, and also primary, secondary or tertiary aliphatic amines and quaternary ammonium compounds, especially dimethylamine, triethylamine, isoamylamine, piperidine, quinoline, tetraethyl ammonium iodide, thus if desired quaternized aliphatic or also aromatic amines. The aliphatic amines, especially monoamines, preferably have saturated hydrocarbon radicals with up to about 10 carbon atoms. The nitrogen atoms may be members of a heterocyclic ring. In many cases it is preferable to use mixtures of two or more complex-forming compounds. There may equally well be used mixtures of compounds which have the same chemical type or those of different constitutions. The substances forming the complex compounds may have added to them, before their addition, one or both components of the catalyst, advantageously dissolved in the organic liquids used in the polymerization. If such large amounts of the complex-forming compounds are used that the mol ratio of complex-forming compounds to organo-metallic compounds approaches 1 or even exceeds 1, the catalyst is less active under atmospheric pressure. It is then better used under increased pressure. The speed of polymerization is considerably increased in many cases by such additions. At the same time the yield of polymer which is obtained with a given amount of catalyst is often improved. The special advantage of the said additions, however, lies in the fact that the formation of oily polymers is considerably reduced. With a mol ratio of titanium to aluminum of for example 1:1 and at yet lower mol ratios, the degree of polymerization is also displaced in the direction of higher molecular weights. As solvents or diluents for the polymerization reaction there come into question for example all indifferent organic hydrocarbons, preferably those which are saturated, as for example hexane, octane, petroleum ether, gasoline or gasoline fractions, as well as saturated cyclic aliphatic or also aromatic hydrocarbons, as for example cyclohexane, methyl cyclohexane, methyl cyclopentane, benzene, toluene or xylene. Regard should be had to the fact that the organic solvents or diluents used already contain in many cases very small amounts of the proposed compounds which form complex compounds with the components of the catalyst. These amounts are however not sufficient substantially to raise the average degree of polymerization. By the presence of different large amounts of complex-forming compounds in the diluent material it is possible to cause differences in the degree of polymerization. In order to obtain constant results, it is therefore preferable first to remove any traces of complex-forming compounds from the organic solvents, for example by hdrogenation or washing with acids, for example sulfuric acid, or also bases, especially aqueous alkali or alkaline earth hydroxides, or with the aid of absorbents, such as silica gel, aluminum oxide, active carbon or two or more of these substances, and then to add the desired amount of the complex-forming compound. It is however, also possible to determine the exact content of complex forming compounds in the organic solvent, for example on the basis of a series of experiments, and to take this into account when adding further amounts of the complex-forming compounds. The polymerization is in general carried out at room temperature or at moderately elevated temperatures, especially at temperatures between about 0° and 100° C., preferably between 30° and 80° C. In many cases it is possible to polymerize at normal pressure or even at reduced pressure. It is obviously also possible however to carry out the polymerization at higher pressures, as for example up to about 50 atmospheres. In the polymerization of propylene for example, it is possible by the use of pressures between about 1 and 40 atmospheres and a mol ratio of organometallic compound to metal halide, for example vanadium tetrachloride, of more than 1, to obtain especially high molecular weight polymers.

The following examples will further illustrate this invention but the invention is not restricted to these examples. The parts specified are parts by weight.

EXAMPLE 1

9 parts of titanium tetrachloride, 3.9 parts of ethyl aluminum sesquichloride and 1.4 parts of isoamyl alcohol (mol ratio of titanium:aluminum:isoamyl alcohol = 1.5:1.0:0.5) are added to 2,800 parts of octane while excluding oxygen and atmospheric moisture and the solution which immediately becomes yellow in color is heated to 50° C. for 30 minutes while at the same time leading through nitrogen free from oxygen. Then, while stirring intensely, dry ethylene free from oxygen is lead in. The polymerization commences immediately with a rise in the temperature of the mixture. The temperature is kept at about 60° to 70° C. by cooling. After 375 parts of ethylene have been absorbed (60 minutes) the reaction is discontinued and after washing and drying there are obtained 355 parts of white pulverulent polyethylene with a limiting viscosity (G. V. Schulz and H. J. Cantow, Makromol. Chem. 13 (1954), page 771) of 1.48. By working up the octane used as solvent, 17 parts of lower molecular weight product are obtained.

By polymerizing in the same way but without the addition of isoamyl alcohol, an absorption of 290 parts of ethylene is obtained after 180 minutes and after working up 185 parts of white pulverulent polyethylene and 103 parts of lower molecular weight products are obtained.

EXAMPLE 2

By using a catalyst of 9 parts of titanium tetrachloride, 3.9 parts of ethyl aluminum sesquichloride and 0.95 part of isopropyl alcohol (mol ratio of titanium:aluminum: isopropyl alcohol = 1.5:1.0:0.5) under the conditions described in Example 1, there is obtained even after 32 minutes an absorption of 375 parts of ethylene which after working up yields 358 parts of white pulverulent polyethylene having a limiting viscosity of 1.63. 16 parts of a lower molecular weight product are also obtained.

EXAMPLE 3

2.8 parts of di-isobutyl ether, 5.7 parts of titanium tetrachloride and 7.5 parts of ethyl aluminum sesquichloride (mol ratio of titanium:aluminum = 0.5) are added to 2,800 parts of octane while excluding oxygen and moisture, and the orange-colored solution is heated to 50° C. while at the same time leading through nitrogen free from oxygen. Then ethylene free from oxygen is led in while stirring vigorously. The reaction starts immediately with a rise in temperature. The temperature is kept at about 60° to 70° C. by cooling. After 220 parts of ethylene have been absorbed, the reaction vessel is completely filled with voluminous polyethylene. After washing and drying there are obtained 220 parts of white pulverulent polyethylene with a limiting viscosity of 0.544.

By polymerizing in the same way but without the addition of di-isobutyl ether, the polymer has a limiting viscosity of 0.214.

EXAMPLE 4

By using a catalyst prepared in the same way as in Example 3 but with only half the amount of di-isobutyl ether (1.4 parts), 580 parts of a less voluminous product are obtained which after washing and drying has a limiting viscosity of 0.305.

EXAMPLE 5

A solution of 1.46 parts of titanium tetrachloride and 1.23 parts of ethyl aluminum sesquichloride in 704 parts of octane is heated for half an hour at 50° C. after the addition of 0.7 part of di-isoamyl ether. Then 59 parts of ethylene are led into this solution while stirring at 50° C. The ethylene is at first completely reacted. When the conversion has fallen to less than 20 percent after about 4 to 5 hours, it is discontinued. 150 parts of polyethylene are obtained which are separated from the octane and washed with oxalic acid and methanol. The limiting viscosity of the polyethylene amounts to 0.175 measured in di-isopropylbenzene at 150° C. 0.1 gram per litre. With pentane it is possible to extract 1.2 percent of oily products from the polyethylene. Similar high molecular weight polymers with high limiting viscosity can be prepared similarly in the presence of anisol and dioxane. By polymerizing in the same way but at 30 to 40 atmospheres pressure, a product is obtained with the limiting viscosity 0.2.

By polymerizing in the same way but without the addition of di-isoamyl ether, 9 parts of an oily product can be extracted from the polymer, while the separated octane contains 35 parts of oil. In this case therefore 24 percent of the product obtained consists of oil.

Table

| | Parts of ether | Polyethylene | | Parts of oil | Percent of oil with reference to total polymer |
|---|---|---|---|---|---|
| | | Parts | Limiting viscosity | | |
| Without the addition of an ether | | 150 | 0.13 | 4.4 | 23.8 |
| Di-iso-amyl ether | 0.7 | 221 | 0.175 | 2.8 | 1.2 |
| Anisol | 0.5 | 291 | 0.218 | 3.7 | 1.2 |
| Dioxane | 0.22 | 353 | 0.148 | 5.9 | 1.6 |

EXAMPLE 6

1.92 parts of vanadium tetrachloride and 1.14 parts of aluminum triethyl are dissolved in 210 parts of iso-octane while excluding air and moisture and 0.7 part of iso-amyl ether is added. Into the resultant violet suspension, propylene which is dry and free from oxygen is led at atmospheric pressure and with powerful stirring. The temperature is kept by cooling at about 40° C. After 4 hours a thick violet pulp has formed to which methanol is added. The whole is stirred until a dark blue layer has separated from the yellowish pulp, and this is stirred again with methanol and hydrochloric acid with the addition of some dioxane, whereby the polymer becomes colorless. After filtering by suction and drying, about 48 parts of polymer with a limiting viscosity of 0.254 (determined in para-di-isopropylbenzene at 150° C.) are obtained. By evaporating the solvent and the washing liquids, about 2.5 parts of oily polymer are obtained.

By working in the same way but without the addition of amyl ether, 31 parts of solid polymer and 3 parts of oil are obtained. The limiting viscosity of the solid product amounts to only 0.193 by the same method of determination. The molecular weight is thus lower.

EXAMPLE 7

Propylene is polymerized as described in Example 6 with a catalyst mixture of 1.92 parts of vanadium tetrachloride, 1.24 parts of aluminum ethyl sesquichloride and 0.4 part of 1.4-dioxane. The amounts of the polymer obtained is 24.2 parts. Of this 22.3 parts 92 percent are solid and 1.9 parts are liquid. The limiting viscosity of the solid fraction, determined according to Example 6, is 0.199. By polymerizing in the same way but without the addition of dioxane, 27 parts of a viscous oil are obtained and only 3 parts of solid product with the specific viscosity 0.124.

EXAMPLE 8

1.3 parts of titanium tetrachloride, 1.2 parts of ethyl aluminum sesquichloride and 0.16 part of acetonitrile are dissolved in 700 parts of octane while excluding oxygen and atmospheric moisture. After stirring for half an hour at 50° C., the contents of the vessel have become brown in color. A powerful current of ethylene is then led in. The polymerization begins immediately. The temperature is kept at about 50° C. by cooling. After 6 hours the polymerization is discontinued and after washing and drying there are obtained 266 parts of white pulverulent polyethylene with a limiting viscosity of 0.262. The distillation residue of the octane and the pentane extraction residue of the polyethylene together yield 2.6 percent of lower molecular weight fraction.

Without the addition of acetonitrile, 150 parts of polyethylene with a limiting viscosity of 0.130 are obtained. A total of 24 percent of lower molecular weight products is obtained.

EXAMPLE 9

By proceeding exactly as in Example 8 but adding 0.21 part of isoamylamine instead of the acetonitrile, 127 parts of polyethylene with a limiting viscosity of 0.202 are obtained. The lower molecular weight fraction amounts to 7.5 percent.

EXAMPLE 10

By polymerizing as described in Example 8 but with 0.2 part of propionaldehyde dimethyl acetal instead of acetonitrile, 166 parts of polyethylene are obtained with a limiting viscosity of 0.131. The lower molecular weight fraction is 6.4 percent.

EXAMPLE 11

By adding 0.5 part of tetraethyl ammonium iodide in Example 8 instead of the acetonitrile there are formed 218 parts of polyethylene with a limiting viscosity of 0.194. The lower molecular weight fraction amounts to 4.9 percent.

We claim:
1. In the low pressure polymerization of a monoolefin selected from the group consisting of ethylene and propylene the improvement which comprises carrying out the polymerization in the presence of a catalyst composition consisting essentially of an aluminum alkyl having from 1 to 8 carbon atoms in the alkyl group, a halide selected from the group consisting of titanium halide and vanadium halide, and a complexing agent selected from the group consisting of diethyl ether, dipropyl ether, di-isopropyl ether, dibutyl ether, diamyl ether, 1.4-dioxane, anisol, and phenyl ethyl ether, the amount of said complexing agent being from about 0.1 to about 0.9 mol per equivalent of aluminum.

2. A polymerization method as in claim 1 wherein the aluminum alkyl is ethyl aluminum sesquichloride.

3. A polymerization method as in claim 1 wherein the halide is titanium tetrachloride.

4. A polymerization method as in claim 1 wherein the mono-olefin is ethylene.

5. A polymerization method as in claim 1 wherein the complexing agent is diethyl ether.

6. A polymerization method as in claim 1 wherein the complexing agent is dipropyl ether.

7. A polymerization method as in claim 1 wherein the complexing agent is di-isopropyl ether.

8. A polymerization method as in claim 1 wherein the complexing agent is dibutyl ether.

9. A polymerization method as in claim 1 wherein the complexing agent is diamyl ether.

10. A polymerization method as in claim 1 wherein the complexing agent is 1.4-dioxane.

11. A polymerization method as in claim 1 wherein the complexing agent is anisol.

12. A polymerization method as in claim 1 wherein the complexing agent is phenyl ethyl ether.

13. In the process for the polymerization of alpha-monoolefins in the presence of a catalyst composition consisting essentially of an aluminum alkyl compound and a titanium halide, the improvement which comprises conducting the polymerization in the presence of up to about 1% by weight, based on the alpha-monoolefin, of an ether, said ether having no olefinic unsaturation.

References Cited in the file of this patent

UNITED STATES PATENTS

| 2,473,549 | Smith | June 21, 1949 |
| 2,478,066 | Van Peski | Aug. 2, 1949 |
| 2,684,954 | Miller | July 27, 1954 |
| 2,685,577 | Cerveny et al. | Aug. 3, 1954 |
| 2,758,953 | Cottle et al. | Aug. 14, 1956 |
| 2,827,446 | Breslow | Mar. 18, 1958 |
| 2,843,577 | Friedlander et al. | July 15, 1958 |
| 2,905,645 | Anderson et al. | Sept. 22, 1959 |
| 2,912,424 | Cash | Nov. 10, 1959 |

FOREIGN PATENTS

| 534,792 | Belgium | Jan. 31, 1955 |
| 534,888 | Belgium | Jan. 31, 1955 |
| 538,782 | Belgium | Dec. 6, 1955 |
| 809,717 | Great Britain | Mar. 14, 1959 |